(12) United States Patent
Liu et al.

(10) Patent No.: US 12,406,579 B1
(45) Date of Patent: Sep. 2, 2025

(54) REAL-TIME MULTI-VEHICLE SENSING AND PERCEPTION

(71) Applicant: Waymo LLC, Mountain View, CA (US)

(72) Inventors: Samuel Liu, Mountain View, CA (US); Dillon Cower, Woodinville, WA (US); Sean Rafferty, Sunnyvale, CA (US); Jiajing Wang, Palo Alto, CA (US); Frank Dachille, Mountain View, CA (US); Karan Mahajan, Seattle, WA (US); Bradley Dodson, Seattle, WA (US); Lukasz Kulik, San Francisco, CA (US); Jayant Thatte, Palo Alto, CA (US); Sandro Young, San Francisco, CA (US); Jennifer Taylor, Palo Alto, CA (US); Ananya Misra, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 148 days.

(21) Appl. No.: 17/959,434

(22) Filed: Oct. 4, 2022

(51) Int. Cl.
*G08B 21/00* (2006.01)
*G08G 1/00* (2006.01)
*G08G 1/09* (2006.01)
*G08G 1/0967* (2006.01)
*H04W 4/40* (2018.01)

(52) U.S. Cl.
CPC ....... *G08G 1/096791* (2013.01); *G08G 1/091* (2013.01); *G08G 1/20* (2013.01); *H04W 4/40* (2018.02)

(58) Field of Classification Search
CPC .... G08G 1/096791; G08G 1/091; G08G 1/20; H04W 4/40
USPC .......................................... 340/905
See application file for complete search history.

(56) References Cited

U.S. PATENT DOCUMENTS

| | | | |
|---|---|---|---|
| 10,789,493 B1 * | 9/2020 | Rocci | G06V 20/13 |
| 2013/0096731 A1 * | 4/2013 | Tamari | G06F 11/3058 701/1 |
| 2014/0078304 A1 * | 3/2014 | Othmer | G06F 21/6218 348/148 |
| 2016/0275790 A1 * | 9/2016 | Kang | G06Q 10/10 |
| 2017/0213462 A1 * | 7/2017 | Prokhorov | G08G 1/166 |
| 2017/0228948 A1 * | 8/2017 | Albitz | G07C 5/0841 |
| 2019/0137287 A1 * | 5/2019 | Pazhayampallil | G05D 1/0291 |
| 2019/0342859 A1 * | 11/2019 | Rubin | H04W 4/12 |

(Continued)

FOREIGN PATENT DOCUMENTS

KR 20220072125 * 6/2022 .......... B60W 30/095

*Primary Examiner* — Mark S Rushing
(74) *Attorney, Agent, or Firm* — Lowenstein Sandler LLP

(57) ABSTRACT

A system includes a first autonomous vehicle (AV) including a sensing system including a set of sensors, a memory storing instructions and a processing device operatively coupled to the memory, wherein the instructions, when executed by the processing device, cause the processing device to perform operations including observing, using data obtained from the sensing system, an event reflecting a scenario within a driving environment, generating a set of event observation data characterizing the event, and causing the set of event observation data to be shared with at least a second AV that is determined to be in a vicinity of the event after the event is observed.

20 Claims, 8 Drawing Sheets

(56) References Cited

U.S. PATENT DOCUMENTS

2021/0174674 A1* 6/2021 McFarland, Jr. ....... G10L 25/57
2021/0181750 A1* 6/2021 Gogna ................. G05D 1/0291

* cited by examiner

REAL-TIME MULTI-VEHICLE SENSING AND PERCEPTION

TECHNICAL FIELD

The instant specification generally relates to autonomous vehicles. More specifically, the instant specification relates to improving autonomous driving systems and components by implementing real-time multi-vehicle sensing and perception.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
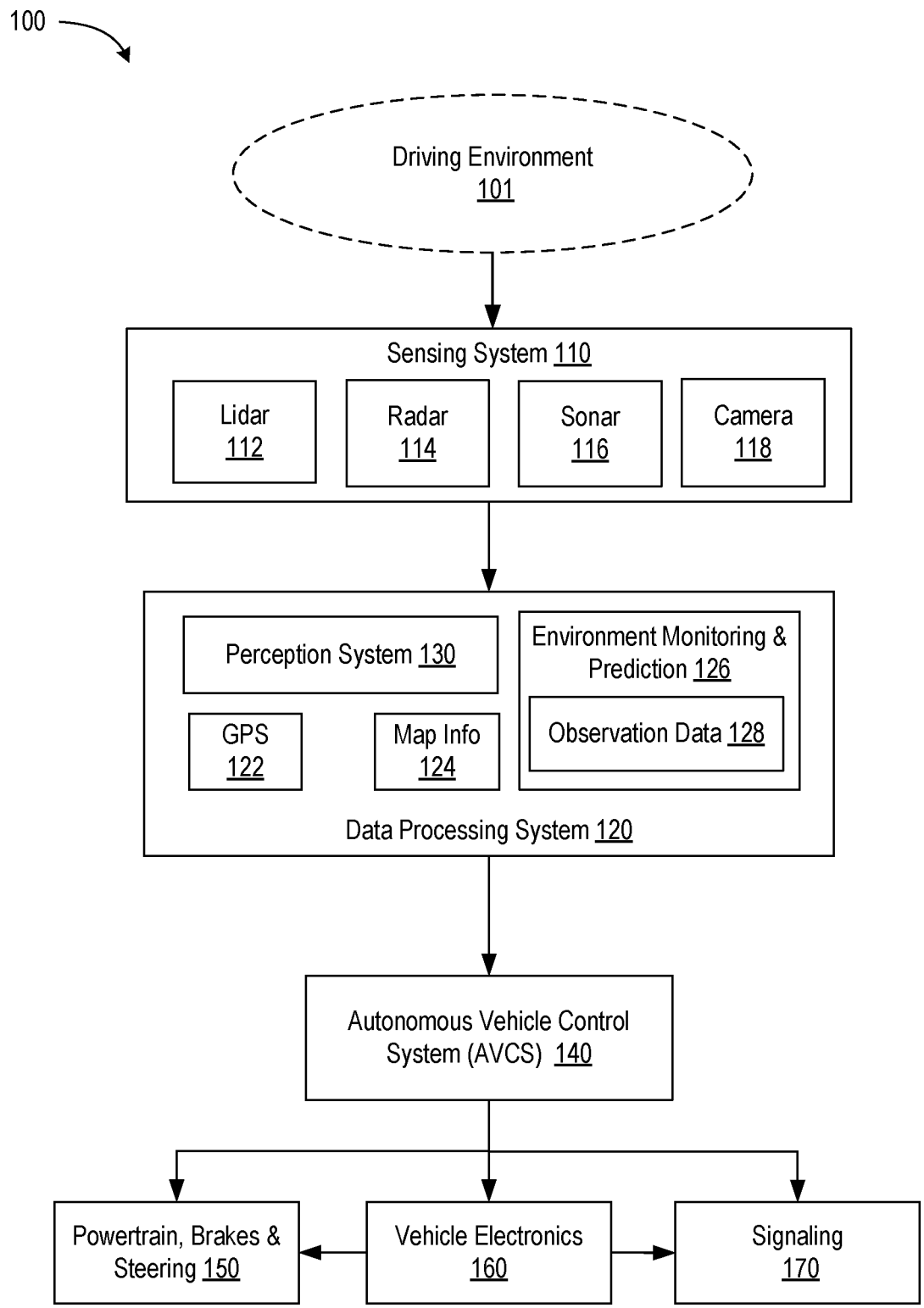
FIG. 1 is a diagram illustrating components of an example autonomous vehicle (AV), in accordance with some implementations of the present disclosure.

In one implementation, disclosed is a system that includes a first autonomous vehicle (AV) including a sensing system including a set of sensors, a memory storing instructions and a processing device operatively coupled to the memory, wherein the instructions, when executed by the processing device, cause the processing device to perform operations including observing, using data obtained from the sensing system, an event reflecting a scenario within the driving environment, generating a set of event observation data characterizing the event, and causing the set of event observation data to be shared with at least a second AV that is determined to be in a vicinity of the event after the event is observed.

In another implementation, disclosed is a system that includes a first autonomous vehicle (AV) including an AV control system, a memory storing instructions and a processing device operatively coupled to the memory, wherein the instructions, when executed by the processing device, cause the processing device to perform operations including obtaining a set of event observation data characterizing an event observed by a second AV within a driving environment, wherein the event reflects a scenario within the driving environment, and wherein the first AV is in a vicinity of the event, and controlling, using the set of event observation data, operation of the first AV with respect to the event via the AV control system.

In another implementation, disclosed is a system that includes at least one server including a memory storing instructions and a processing device operatively coupled to the memory, wherein the instructions, when executed by the processing device, cause the processing device to perform operations including identifying a first autonomous vehicle (AV) within a vicinity of an event reflecting a scenario within a driving environment, obtaining a set of event observation data characterizing the event observed by a second AV, wherein the event is observed by the second AV prior to identifying the second AV within the vicinity of the event, and sending the set of event observation data to the first AV to notify the first AV that is in the vicinity of the event.

DETAILED DESCRIPTION

An autonomous vehicle (AV) can employ sensing technology to detect distances to various objects in the environment and the velocities of such objects. For example, an AV can employ radio detection and ranging (radar) technology, light detection and ranging (lidar) technology, camera technology, etc. A radar sensor emits one or more radio wave signals (e.g., radio pulses) that travel to an object and then detects arrived radio wave signals reflected from the object. A lidar sensor emits one or more light wave signals (e.g., laser pulses) that travel to an object and detects arrived light wave signals reflected from the object. By determining a time delay between the signal emission and the arrival of the reflected waves, a sensor can determine the distance to the object. A typical sensor emits signals in multiple directions to obtain a wide view of the outside environment. One or more sensors can cover sectors in space by using a series of consecutive sensing frames identified with timestamps. As a result, each sector in space is sensed in time increments $\Delta\tau$, which are determined by the angular velocity of the sensor's scanning speed. Sometimes, an entire 360-degree view of the environment can be obtained over a full scan. Alternatively, any smaller sector, e.g., a 1-degree sector, a 5-degree sector, a 10-degree sector, or any other sector can be scanned, as desired.

Each frame can include numerous return points (or simply "points") corresponding to reflections from various objects of the environment. Each point can be associated with the distance to the corresponding object or, more specifically, with the distance to an element of the reflective surface of the object (reflecting region) responsible for the respective return point. A set of points within a given frame can be referred to as a "point cloud." A point cloud can include returns from multiple objects. Typically, it is not known a priori how many objects are within a given frame and to what types (e.g., cars, trucks, buses, motorcycles, pedestrians, road signs, trees, etc.) the objects in the frame belong.

Time-of-flight (ToF) sensors are typically used for ranging. ToFs can also be capable of determining the velocity (speed and direction of motion) of a return point by emitting two or more signals (e.g., as part of different sensing frames) in a quick succession and detecting the position of the reflecting surface as the surface moves with each additional frame. The intervals between successive signals (frames) can be short enough so that the object does not change its position appreciably in relation to other objects of the environment, but still long enough to allow the radar or lidar to detect accurately the changes in the object's position. Coherent sensors, e.g., frequency-modulated continuous wave (FMCW) radars and/or lidars take advantage of a phase information encoded into transmitted signals (and carried by the emitted electromagnetic waves to the target and back) and provide additional functionality. A coherent sensor detects changes in the frequency (and the accompanying phase) of the reflected wave induced by the motion of the reflecting surface, a phenomenon known as the Doppler effect. The frequency/phase of the reflected wave is sensitive to the component of the velocity of the reflecting surface $V_r$ that is parallel to the direction of the wave propagation, herein referred to as the "radial" velocity. A coherent sensor allows associating a radial velocity with the return points of the point cloud. This additional information (which can be obtained separately or together with the range information) helps the sensing system of the autonomous vehicle to identify the state of the motion of various objects.

A number of different hazardous scenarios can be present while an AV is autonomously driving within a driving environment. A hazardous scenario can refer to a scenario that can lead to danger (e.g., collision), unless the AV successfully alters its current driving behavior in reaction to the hazardous scenario. Examples of such hazardous scenarios can include an emergency vehicle (e.g., fire truck, ambulance or police car) that is traveling at a high rate of speed down a road with its siren on, a hazard observed on a road (e.g., stopped car, traffic accident, pedestrian or construction zone), or a weather hazard observed with the driving environment (e.g., hazardous road conditions or hazardous atmospheric conditions).

Without the AV having knowledge of the presence of a hazardous scenario within its vicinity ahead of time, the AV may be unable to effectively and/or safely react to the hazardous scenario. For example, in the case of an emergency vehicle approaching an intersection at a direction perpendicular to the direction of travel of the AV, the field-of-view (FOV) of sensors of the AV may be limited or obstructed (e.g., by a building), which can prevent the AV from being able to directly observe the emergency vehicle (even though it can hear the siren via its microphones). Accordingly, depending on how the AV control system is designed, the AV may end up overreacting or underreacting to the emergency vehicle due to a lack of information (e.g., heading, speed and/or coordinate location of the emergency vehicle).

Aspects and implementations of the present disclosure address these and other shortcomings by implementing real-time multi-vehicle sensing and perception. Implementations described herein can enable AVs to share observations (e.g., sensing and/or perception information) made using their onboard sensing systems and server-orchestrated fleet communication. For example, the AVs can be included within a fleet of AVs. That is, implementations described herein can enable each AV to leverage observations made by one or more other AVs in making autonomous driving decisions within a driving environment. By doing so, an AV can improve environment monitoring and prediction by supplementing its own onboard generated sensing and perception data with observations made by other AVs, and thus improve the decision making ability of the AV in uncertain driving environments.

In some implementations, observations made by AVs can be shared with other AVs (e.g., of the fleet of AVs) using a server-orchestrated communication system. The system can include at least one server, communicably coupled to each AV of a fleet of AVs, to mediate real-time communication between the AVs. For example, the at least one server can receive a first set of event observation data from a first AV. The first set of event observation data can include data related to an object observed by the first AV within a local area during operation in a driving environment. For example, the first set of event observation data can include location information of the first AV, location information of the object observed by the first AV, etc. The first set of event observation data can be sent as an event message, and the at least one server can implement an event listener that waits for event messages to be received from AVs.

After receiving the first set of event observation data, the at least one server can store (e.g., cache) the first set of event observation data within a data store operatively coupled to the at least one server. The data store can be a geospatial data store that supports rapid read/write access. In some embodiments, the data store is a database. For example, the database is an in-memory database.

The at least one server can broadcast a second set of event observation data to AVs that are in the vicinity of the local area (e.g., within a threshold distance from the local area). For example, upon determining that at least a second AV (e.g., of the fleet of AVs) is in the vicinity of the local area, the at least one server can broadcast the second set of event observation data to the second AV. The second AV can use the second set of event observation data, in conjunction with its own onboard generated sensing and perception data, to control the operation of the second AV via its AV control system.

In some implementations, the first set of event observation data is a set of raw event observation data. For example, the set of raw event observation data can include pose data, localized pose data, audio data, etc. To reduce computational complexity and improve computational efficiency, the at least one server can generate the second set of event observation data by processing the set of raw event observation data. The second set of event observation data can be generated to include relevant data characterizing the event that can be used by AVs of the fleet to supplement its own onboard generated sensing and perception data within the driving environment. For example, the second set of event observation data can include at least one of: heading, speed, or coordinate location.

In some implementations, the at least one server includes a first server and a second server. For example, the first server can receive and store the first set of event observation data, and the second server can broadcast the second set of event observation data.

A time delay can exist due to system latency. For example, the latency between the first AV and the data store can be about one second, and the total round trip latency from the time that the first set of event observation data is received by the first server to the time that the second set of event observation data is received by the second AV can be between about one second to about two seconds.

A number of techniques can be used to reduce the time delay to further improve accuracy. Examples of techniques that can be used to reduce the time delay may include using time-synchronized clocks on the AVs and the at least one server, using a data store including a fast in-memory database, removing old observation event data (e.g., removing a set of event observation data from the data store after a threshold amount of time as determined from a timestamp of the set of event observation data), having the second AV integrate uncertainty during behavior prediction and planning (e.g., create a measurement with uncertainty bounds), etc. Further details regarding the server-orchestrated communication system will be described herein below.

In some implementations, an observation made by an AV of a fleet of AVs of an event within a driving environment can be shared directly with other AVs of the fleet. For example, a first AV of the fleet can broadcast a message to a second AV of the fleet using direct wireless communication upon determining that the second AV is in the vicinity of the event. Examples of direct wireless communication include short range wireless communication protocols (e.g., Bluetooth, Wi-Fi) and long-range wireless communication protocols (e.g., LoRA). Further details regarding implementing real-time multi-vehicle sensing and perception will be described in further detail below with reference to FIGS. 1-7.

Implementations described herein can be used in a variety of driving environment event scenarios ("scenarios") in which it would be beneficial for an AV to receive a set of event observation data relating to an observation of a potential hazard.

For example, implementations described herein can be applied to emergency vehicle event scenarios to improve AV reactions to emergency vehicles, such as fire trucks, ambulances, police cars, etc. As one illustrative scenario, assume that a first AV of a fleet of AVs is approaching a cross-shaped intersection in a first direction (e.g., northbound) and has a green light, a second AV of the fleet is approaching the intersection in a second direction perpendicular to the first direction (e.g., eastbound) and has a red light, and an emergency vehicle emitting a siren noise (e.g., a fire truck, ambulance or police car) is approaching the intersection in a third direction parallel to the second direction (e.g., westbound) and also has the red light. The emergency vehicle may be traveling at a high rate of speed due to an emergency situation. Further assume that the first AV's view of the emergency vehicle is occluded by an object, such as a tall building. Although the first AV can hear the siren, the first AV may not be able to determine whether the emergency vehicle warrants a reaction (e.g., due to front-back confusion from the microphones of the first AV and/or sound reflections). The second AV can observe the emergency vehicle approaching the intersection.

If the first AV operates more conservatively with incomplete information regarding the emergency vehicle, the first AV may be eager to react to the siren by unnecessarily causing a hard brake event, which can lead to a rear-end collision, unnecessarily blocking traffic flow behind the first AV, etc. If the first AV operates more aggressively with incomplete information regarding the emergency vehicle, the first AV may fail to react to the siren, which can impede the path of the emergency vehicle that is attempting to proceed through the intersection and/or cause a collision with the emergency vehicle.

To obtain more complete information regarding the emergency vehicle, the first AV can receive a set of event observation data related to the observation of the emergency vehicle made by the second AV. For example, the at least one server can receive the set of event observation data from the second AV, detect that the first AV is in the vicinity of the emergency vehicle, and send the set of event observation data to the first AV. The first AV can receive the set of event observation data after a time delay due to latency (e.g., between about 1 second to about 2 seconds). Despite the time delay, the set of event observation data is still useful to the first AV, as it can still enable the first AV to generate a speculative object using its onboard siren detection in combination with the set of event observation data from the second AV. As another example, the second AV can directly broadcast the set of event observation data to the first AV using wireless transmission. Further details regarding this example driving environment event scenario will be described in further detail below with reference to FIG. 3.

As another example, implementations described herein can be applied to road hazard event scenarios to improve AV reactions to hazards observed on a road. Examples of hazards include stopped cars (e.g., stalled cars, double parked cars), traffic accidents, pedestrians, construction zones, etc. As an illustrative scenario, assume that a vehicle is stopped on a road, such as a highway (e.g., in a lane or on the shoulder). Assume that a first AV of a fleet of AVs is approaching the stopped vehicle. The first AV may want to change lanes to either avoid a collision with the stopped vehicle (e.g., if the vehicle happens to be stopped in the same lane that the first AV is operating in), or to establish some space away from the stopped vehicle (which may be required by law) (e.g., if the vehicle happens to be stopped in a shoulder or lane adjacent to the lane that the first AV is operating in). Such a lane change can be difficult or impossible depending on the surrounding traffic conditions, so receiving an early warning of a stopped vehicle can enable the first AV to change lanes ahead of the stopped vehicle, even before it is visible.

To obtain the early warning of the stopped vehicle, the first AV can receive a set of event observation data related to an observation of the stopped vehicle made by a second AV of the fleet. For example, the at least one server can receive the set of event observation data from the second AV, detect that the first AV is in the vicinity of the stopped vehicle, and send the set of event observation data to the first AV. In some implementations, the first AV is the initial AV of the fleet to observe the stopped vehicle, such that all subsequent AVs of the fleet can receive the set of event observation data. In addition, each passing AV can update the current state, including reporting to the at least one server whether the stopped vehicle is no longer present. As another example, the second AV can directly broadcast the set of event observation data to the first AV using wireless transmission. Further details regarding this example driving environment event scenario will be described in further detail below with reference to FIGS. 4A-4B.

As yet another example, implementations described herein can be applied to traffic light event scenarios to improve AV navigation. As an illustrative scenario, assume that a first AV of a fleet of AVs is approaching a traffic light. The first AV can report to the at least one server a state of the traffic light (e.g., red light, yellow light, green light). This information can be provided to a second AV of the fleet of AVs approaching the area to determine an optimal route for the second AV. For example, assume that the first AV reports that the traffic light just turned orange, and previous knowledge indicates that the traffic light will not turn green again for at least 3 minutes. The second AV can take that information into account when determining an optimal route, which can improve service times.

As yet another example, implementations described herein can be applied to weather event scenarios to improve AV reactions to weather hazards. Using appropriate onboard sensors and estimators, an AV can detect many weather hazards that are relevant to a particular driving task. Examples of weather hazards include hazardous road conditions (e.g., wetness, puddles, ice, or snow) and hazardous atmospheric conditions (e.g., fog, rain, snow, hail). While external meteorological data may be available to the AV, the external meteorological data can be too coarse in time (e.g., meteorological data may be reported by weather stations in 15 minute windows) and/or space (e.g., there may be a low geospatial density of weather stations reporting meteorological data within a region).

To address the coarseness of external meteorological data, a first AV of a fleet of AVs can use its onboard sensors and estimators to obtain a set of event observation data related to a weather hazard observed within a driving environment. For example, the at least one server can receive the set of event observation data from the first AV, detect that a second AV of the fleet is in the vicinity of the weather hazard, and send the set of event observation data to the second AV before entering the area of the weather hazard. As another example, the first AV can directly broadcast the set of event observation data to the second AV using wireless transmission.

For example, fog can be highly localized and fog conditions in a local area can change rapidly. It may be difficult for an AV to recognize reduced visibility due to the fog until the AV has driven into the foggy area. By having the first AV communicate a set of event observation data related to the fog conditions in the local area, the second AV (and other AVs of the fleet) can navigate around the fog or drive with additional caution upon entering the fog.

As another example, hazardous road conditions can affect traction and maneuverability of vehicles due to reduced coefficient of friction relative to normal road conditions. Hazardous road conditions can be very difficult to detect from a distance. By having the first AV communicate a set of event observation data related to a hazardous road condition observed within a driving environment, the second AV (and other AVs of the fleet) can attempt to avoid the hazardous road condition or drive with additional caution upon encountering the hazardous road condition. Further details regarding this example driving environment event scenario will be described in further detail below with reference to FIGS. 5A-5B.

Advantages of the described implementations include improved AV perception. Such improved AV perception can translate into safer, more comfortable, and more fuel-efficient autonomous driving.

FIG. 1 is a diagram illustrating components of an example autonomous vehicle (AV) 100 capable of combining radar data with camera data for fast and reliable verification of radar detections, in accordance with some implementations of the present disclosure. Autonomous vehicles can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input).

A driving environment 101 can include any objects (animated or non-animated) located outside the AV, such as roadways, buildings, trees, bushes, sidewalks, bridges, mountains, other vehicles, pedestrians, and so on. The driving environment 101 can be urban, suburban, rural, and so on. In some implementations, the driving environment 101 can be an off-road environment (e.g. farming or other agricultural land). In some implementations, the driving environment can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 101 can be located at any distance from the AV, from close distances of several feet (or less) to several miles (or more).

The example AV 100 can include a sensing system 110. The sensing system 110 can include various electromagnetic (e.g., optical) and non-electromagnetic (e.g., acoustic) sensing subsystems and/or devices. The sensing system 110 can include a radar 114 (or multiple radars 114), which can be any system that utilizes radio or microwave frequency signals to sense objects within the driving environment 101 of the AV 100. The radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. The sensing system 110 can include a lidar 112, which can be a laser-based unit capable of determining distances to the objects and velocities of the objects in the driving environment 101. Each of the lidar 112 and radar 114 can include a coherent sensor, such as a frequency-modulated continuous-wave (FMCW) lidar or radar sensor. For example, radar 114 can use heterodyne detection for velocity determination. In some implementations, the functionality of a ToF and coherent radar is combined into a radar unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple radars 114 and/or lidars 112 can be mounted on AV 100.

Radar 114 can include one or more radio/microwave sources producing and emitting signals and one or more detectors of the signals reflected back from the objects. In some implementations, radar 114 (or multiple radars 114)

can perform a 360-degree scanning in a horizontal direction. In some implementations, radar(s) 114 can be capable of spatial scanning along both the horizontal and vertical directions. In some implementations, the field of view can be up to 90 degrees in the vertical direction (e.g., with at least a part of the region above the horizon being scanned with radar signals). In some implementations, the field of view can be a full sphere (consisting of two hemispheres).

The sensing system 110 can further include one or more cameras 118 to capture images of the driving environment 101. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can also include one or more sonars 116, which can be ultrasonic sonars, in some implementations.

The sensing data obtained by the sensing system 110 can be processed by a data processing system 120 of AV 100. For example, the data processing system 120 can include a perception system 130. The perception system 130 can be configured to detect and track objects in the driving environment 101 and to recognize the detected objects. For example, the perception system 130 can analyze images captured by the cameras 118 and can be capable of detecting traffic light signals, road signs, roadway layouts (e.g., boundaries of traffic lanes, topologies of intersections, designations of parking places, and so on), presence of obstacles, and the like. The perception system 130 can further receive radar sensing data (Doppler data and ToF data) to determine distances to various objects in the environment 101 and velocities (radial and, in some implementations, transverse, as described below) of such objects. In some implementations, the perception system 130 can use radar data in combination with the data captured by the camera(s) 118, as described in more detail below.

The perception system 130 can further receive information from a positioning subsystem (not shown in FIG. 1), which can include a GPS transceiver (not shown), configured to obtain information about the position of the AV relative to Earth and its surroundings. The positioning subsystem can use the positioning data, e.g., GPS and IMU data) in conjunction with the sensing data to help accurately determine the location of the AV with respect to fixed objects of the driving environment 101 (e.g. roadways, lane boundaries, intersections, sidewalks, crosswalks, road signs, curbs, surrounding buildings, etc.) whose locations can be provided by map information 135. In some implementations, the data processing system 120 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

The data processing system 120 can further include an environment monitoring and prediction component 126, which can monitor how the driving environment 101 evolves with time, e.g., by keeping track of the locations and velocities of the animated objects (e.g., relative to Earth). In some implementations, the environment monitoring and prediction component 126 can keep track of the changing appearance of the environment due to a motion of the AV relative to the environment. In some implementations, the environment monitoring and prediction component 126 can make predictions about how various animated objects of the driving environment 101 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 126 can conclude that object 1 is resuming its motion from a stop sign or a red traffic light signal. Accordingly, the environment monitoring and prediction component 126 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 126 can conclude that object 2 is stopping at a stop sign or at a red traffic light signal. Accordingly, the environment monitoring and prediction component 126 can predict where object 2 is likely to be within the next 1 or 3 seconds. The environment monitoring and prediction component 126 can perform periodic checks of the accuracy of its predictions and modify the predictions based on new data obtained from the sensing system 110.

The data generated by the perception system 130, the GPS data processing module 122, and the environment monitoring and prediction component 126 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stopped vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In some implementations, the data processing system 120 can further include a set of event observation data 128 characterizing an event observed within the driving environment 101. In this illustrative example, the set of event observation data 128 is included within the environment monitoring and prediction component 126. However, in other implementations, the set of event observation data 128 can be included within another component of the data processing system 120 (e.g., the perception system 130). The set of event observation data 128, in conjunction with other data obtained by the AV 100 (e.g., the sensing system 110), can be used by the AVCS 140 to improve the reaction of the AV 100 to the event observed within the driving environment 101, and thus improve the driving decisions made by the AVCS 140 with respect to the event observed within the driving environment 101.

In some implementations, the set of event observation data 128 is generated by the AV 100. For example, the set of event observation data 128 can be derived from sensor data obtained from at least one sensor of the sensing system 110 (e.g., lidar 112, radar 114, sonar 116 and/or camera 118). The AV 100 can transmit (e.g., using the environment monitoring and prediction component 126 or another appropriate component) the set of event observation data 128 generated by the AV 100 to at least one server of a server-orchestrated communication system or to one or more other AVs, as described in more detail herein.

In some implementations, the AV 100 can receive (e.g., using the environment monitoring and prediction component 126 or another appropriate component) the set of event observation data 128 from another AV to supplement observation data obtained by the AV 100. The AV 100 and the other AV can be part of a fleet of AVs. For example, the event can be related to an emergency vehicle observed approaching an intersection within the driving environment 101, a hazard observed on a road within the driving environment 101 (e.g., a stopped car, a traffic accident, a pedestrian, or a construction zone), or a weather hazard observed on a road within the driving environment 101 (e.g., a hazardous road condition or a hazardous weather condition).

In some implementations, the set of event observation data 128 can be received via a server-orchestrated communication system. For example, the other AV can send a first set of event observation data to at least one server of the system. Upon determining that the AV 100 is in the vicinity of the event observed with the driving environment 101, the at least one server can send the set of event observation data 128 to the AV 100 as a second set of event observation data. In some implementations, the first set of event observation data is a set of raw event observation data, and the second set of event observation data is generated by processing the first set of event observation data. The processing can be performed to reduce computational complexity and improve computational efficiency with respect to the AV 100. Further details regarding the server-orchestrated communication system will be described below with reference to FIGS. 2A-2B.

In some implementations, the set of event observation data 128 is received by the AV 100 directly from the other AV. For example, the other AV can broadcast a message to the AV 100 using direct wireless communication upon determining that the AV 100 is in the vicinity of the event observed within the driving environment 101. Examples of direct wireless communication include short range wireless communication protocols (e.g., Bluetooth, Wi-Fi) and long-range wireless communication protocols (e.g., LoRA).

Figure 2A:
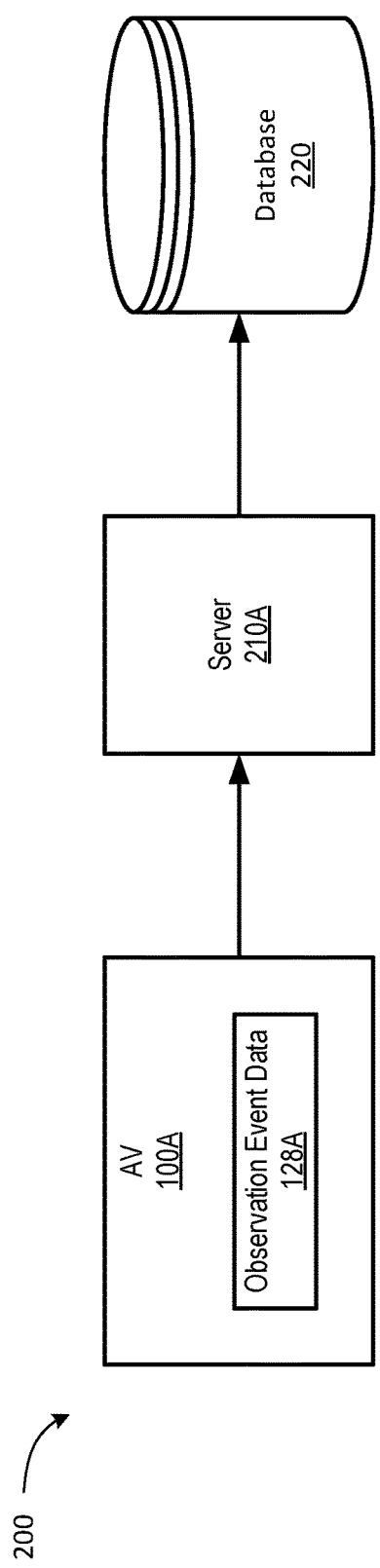
FIGS. 2A-2B are diagrams illustrating an example system for implementing real-time multi-vehicle sensing and perception, in accordance with some implementations of the present disclosure.
Figure 2B:
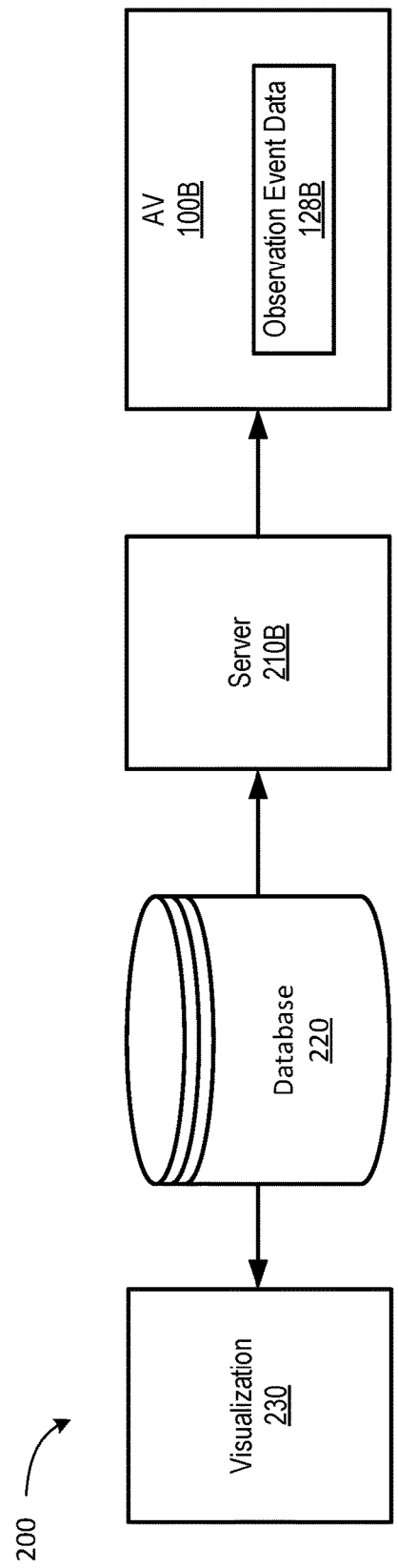

FIGS. 2A-2B are diagrams illustrating an example system 200 for implementing real-time multi-vehicle sensing and perception, in accordance with some implementations of the present disclosure. For example, the system 200 can include an AV 100A and an AV 100B. The AV 100A and the AV 100B can be part of a fleet of AVs. The AV 100A and the AV 100B can each include components similar to the AV 100 described above with reference to FIG. 1.

The system 200 can further include a server 210A and a server 210B communicably coupled to the AV 100A, the AV 100B, and a data store, illustratively depicted as a database 220. Although the system 200 is shown including two different servers, the system 200 can include any number of servers. In some implementations, the system 200 includes a single server (e.g., the functionality of server 210A and server 210B are performed by the single server). In some implementations, the database 220 is a geospatial database that supports rapid read/write access. For example, the database 220 can include an in-memory database.

The system 200 is a server-orchestrated communication system that can be used to communicate observation event data between AVs of the fleet. Referring to FIG. 2A, the AV 100A can obtain a set of event observation data 128A characterizing an event observed by the AV 100A within a driving environment. For example, as will be described in further detail below with reference to FIG. 3, the set of event observation data 128A can be related to an emergency vehicle observed by the AV 100A approaching an intersection within the driving environment. As another example, as will be described in further detail below with reference to FIGS. 4A-4B, the set of event observation data 128 can be related to a hazard observed by the AV 100A on a road (e.g., highway) within the driving environment. As yet another example, as will be described in further detail below with reference to FIGS. 5A-5B, the set of event observation data 128 can be related to a weather hazard observed by the AV 100A within the driving environment. Examples of weather hazards include hazardous road conditions (e.g., wet road patches, icy road patches, snowy road patches) and hazardous atmospheric conditions (e.g., fog, rain, snow, hail).

In some implementations, the server 210A and/or the server 210B can determine current locations of the AV 100A, the AV 100B and other AVs that are part of the fleet with respect to the event (e.g., based on location data received from the AVs or another device used to monitor the locations of the AVs). Referring to FIG. 2B, upon determining (based on the current location of the AV 100B) that the AV 100B is in the vicinity of the event corresponding to the set of event observation data 128A, the server 210B can send a set of event observation data 128B to the AV 100B. For example, the server 210B can broadcast a message including the set of event observation data 128B to the AV 100B. The set of event observation data 128B can include relevant data characterizing the event that can be used by the AV 100B (and other AVs of the fleet) to supplement its own onboard generated sensing and perception data (e.g., data obtained from the sensing system 110 and the perception system 130 of FIG. 1) within the driving environment. For example, the set of event observation data 128B can include at least one of: heading, speed, or coordinate location. Accordingly, the AV 100B can use the set of event observation data 128B, in conjunction with its own onboard generated sensing and perception data, to control the operation of the AV 100B via its AV control system (e.g., AVCS 140 of FIG. 1).

In some implementations, the set of event observation data 128A is a set of raw event observation data, and the set of event observation data 128B is a set of processed event observation data generated by processing the set of event observation data 128A. For example, the server 210A can store the set of event observation data 128A within the database 220, and the server 210B can generate the set of event observation data 128B prior to broadcasting the set of event observation data 128B to the AV 100B. As another example, the server 210A can generate the set of event observation data 128B, and store the set of event observation data 128B within the database 220. In some implementations, the set of event observation data 128A is the same as the set of event observation data 128B. For example, the AV 100A can preprocess raw observation event data to generate the set of event observation data 128B, and send the set of event observation data 128B to the server 210A for storage within the database 220.

A time delay can exist due to latency of the communication between the AV 100A and the server 210A and the communication between the server 210B and the AV 100B. For example, it can take about 1 second to transmits and store the set of event observation data 128A/128B within the database 220 from when the AV 100A sends the set of event observation data 128A/128B to the server 210A, and the total latency for broadcasting the set of event observation data 128A/B to the AV 100B can be between about one second to about two seconds.

A number of techniques can be used to reduce the time delay to further improve accuracy. Examples of techniques that can be used to reduce the time delay may include using time-synchronized clocks on the AV 100A, the AV 100B, the server 210A and the server 210B, using a fast in-memory database for the database 220, removing old observation event data (e.g., removing observation event data from the database 220 after a threshold amount of time as determined from a timestamp of the set of event observation data), having the AV 100B integrate uncertainty during behavior prediction and planning (e.g., create a measurement with uncertainty bounds), etc.

The set of observation data 128A and/or the set of observation data 128B can be used to extrapolate a future location of an object at a specified amount of time after the detection by the AV 100A. For example, in the case of an emergency vehicle, information such as the heading, speed and/or coordinate location of the emergency vehicle and/or AV 100A and AV 100B can be used by the AV 100A, the AV 100B, the servers 210A and/or the server 210B to predict the location of the emergency vehicle at the specified time after the detection by the AV 100A (with some amount of uncertainty).

In some implementations, the server 210A and/or the server 210B can de-duplicate observations. For example, the server 210A and/or the server 210B can determine whether multiple observations related to the same hazardous scenario exist, and de-duplicate the observations in response to determining that the multiple observations related to the same hazardous scenario exist. De-duplicating the observations can include merging observations and/or removing observations. For example, if multiple AVs have observed the same weather hazard within a driving environment (e.g., puddle), then the server 210A and/or the server 210B can de-duplicate sets of observation data related to the weather hazard. As another example, if multiple AVs have observed the same emergency vehicle, then the server 210A and/or the server 210B can de-duplicate sets of observation data related to the emergency vehicle.

Although not shown in FIGS. 2A-2B, in some implementations, the AV 100A can share the set of event observation data 128A/128B directly with the AV 100B. For example, the AV 100A can broadcast a message to the AV 100B using direct wireless communication upon determining that the AV 100B is in the vicinity of the event (e.g., based on location data broadcast by the AV 100B to the AV 100A). Examples of direct wireless communication include short range wireless communication protocols (e.g., Bluetooth, Wi-Fi) and long-range wireless communication protocols (e.g., LoRA).

In some implementations, the system 200 can further include a visualization component 230 communicably coupled to the database 220. The visualization component 230 can cause a visualization of the set of event observation data 128A and/or the set of event observation data 128B to be displayed on a client device. For example, a user can review the set of event observation data 128A and/or the set of event observation data 128B. Further details regarding the operations performed by the system 200 will be described below with reference to FIGS. 3-6C.

Figure 3:
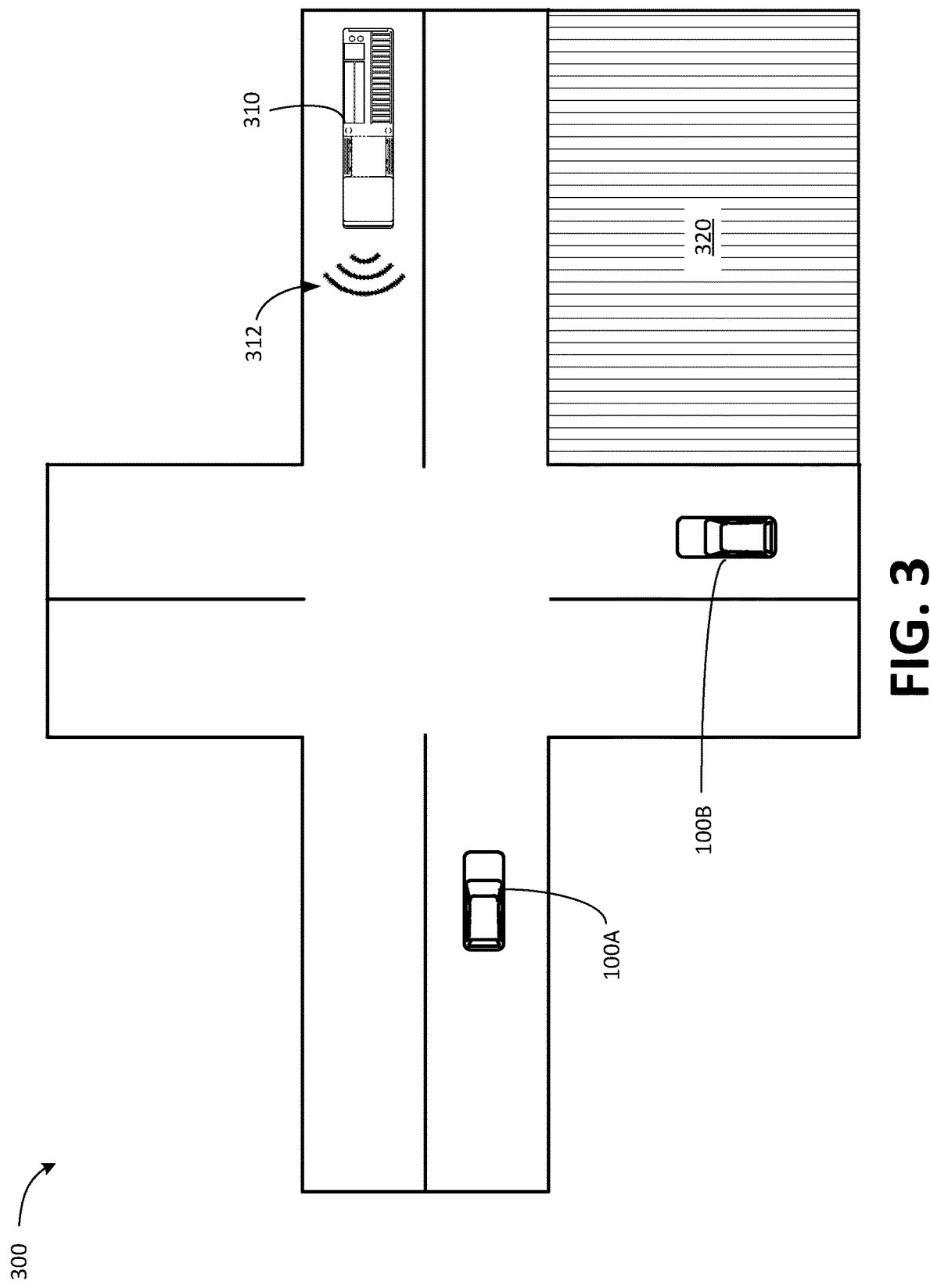
FIG. 3 is a diagram illustrating an example driving environment event scenario for implementing real-time multi-vehicle sensing and perception, in accordance with some implementations of the present disclosure.

FIG. 3 is a diagram 300 illustrating an example driving environment event scenario ("scenario") 300 for implementing real-time multi-vehicle sensing and perception, in accordance with some implementations of the present disclosure. More specifically, the scenario is an example of an emergency vehicle event scenario.

The diagram 300 shows an intersection including the AV 100A, the AV 100B, and an emergency vehicle 310. As described above, the AV 100A and the AV 100B can be included within a fleet of AVs. In this illustrative example, the emergency vehicle 310 is depicted as a fire truck. However, the emergency vehicle 310 can be any type of emergency vehicle in accordance with implementations described herein (e.g., ambulance, police car). The diagram 300 further shows an occlusion 320 blocking the field-of-view of the AV 100B. For example, the occlusion 320 can be a building.

In this example, it is assumed the AV 100B approaching the intersection in a first direction (e.g., northbound), the AV 100A is approaching the intersection in a second direction perpendicular to the first direction (e.g., eastbound), and the emergency vehicle is approaching the intersection in a third direction parallel to the second direction (e.g., westbound). A traffic safety mechanism, such as a traffic light system or stop signs (not shown) can be included to direct traffic at the intersection.

It is assumed that the emergency vehicle 310 is responding to an emergency situation, such as a fire, and is emitting a siren noise 312. The emergency vehicle 310 may also be traveling at a high rate of speed in order to quickly arrive at the scene of the emergency situation. For example, if the traffic safety mechanism is a traffic light system, the AV 100B can have a green light while the AV 100A and the emergency vehicle 310 can have a red light, and the emergency vehicle 310 intends on driving through the red light.

Although the AV 100B can hear the siren, the AV 100B is unable to observe the emergency vehicle 310 directly (e.g., using radar, lidar and/or camera(s)) due to the occlusion 320. Thus, the AV 100B may not be able to determine whether the emergency vehicle 310 warrants a reaction by the AV 100B (e.g., due to front-back confusion from the microphones of the AV 100B and/or sound reflections). If the AV 100B operates more conservatively with incomplete information regarding the emergency vehicle 310, the AV 100B may be eager to react to the siren 312 by unnecessarily causing a hard brake event, which can lead to a rear-end collision if a vehicle is traveling behind the AV 100B, unnecessarily blocking traffic flow behind the AV 100B, etc. If the AV 100B operates more aggressively with incomplete information regarding the emergency vehicle, the AV 100B may fail to react to the siren 312, which can impede the path of the emergency vehicle 310 that is attempting to proceed through the intersection and/or cause a collision with the emergency vehicle 310.

To obtain more complete information regarding the emergency vehicle 310 in making autonomous driving decisions, the AV 100B can receive a set of event observation data related to the observation of the emergency vehicle 310 made by the AV 100A (since the AV 100A can observe the emergency vehicle 310 directly). For example, the set of event observation data can include the heading, speed and coordinate location of the emergency vehicle 310 as determined by the AV 100A.

In some implementations, the set of event observation data can be provided to the AV 100B via a server-orchestrated communication system (e.g., the system 200 of FIGS. 2A-2B). For example, at least one server of the server-orchestrated communication system (e.g., server 210A of FIGS. 2A-2B) can receive a first set of event observation data related to the observation of the emergency vehicle 310 (e.g., a set of raw event observation data) from the AV 100A and store the first set of event observation data in a data store (e.g., the database 220 of FIGS. 2A-2B). In response to determining that the AV 100B is in the vicinity of the emergency vehicle 310, the at least one server (e.g., server 210B of FIGS. 2A-2B) can provide a second set of event observation data related to the observation of the emergency vehicle 310 to the AV 100B (e.g., a set of relevant observation event data related to the observation of the emergency vehicle 310 obtained by processing the set of raw event observation data).

The AV 100B can receive the second set of event observation data after a time delay due to latency (e.g., between about 1 second to about 2 seconds). Despite the time delay, the set of event observation data is still useful to the AV 100B, as it can still enable the AV 100B to generate a speculative object using its onboard siren detection in combination with the second set of event observation data.

In some implementations, the AV 100A can share the set of event observation data directly with the AV 100B. For example, the AV 100A can broadcast a message to the AV 100B using direct wireless communication. Examples of direct wireless communication include short range wireless communication protocols (e.g., Bluetooth, Wi-Fi) and long-range wireless communication protocols (e.g., LoRA). Further details regarding FIG. 3 are described above with reference to FIGS. 1-2.

Figure 4A:
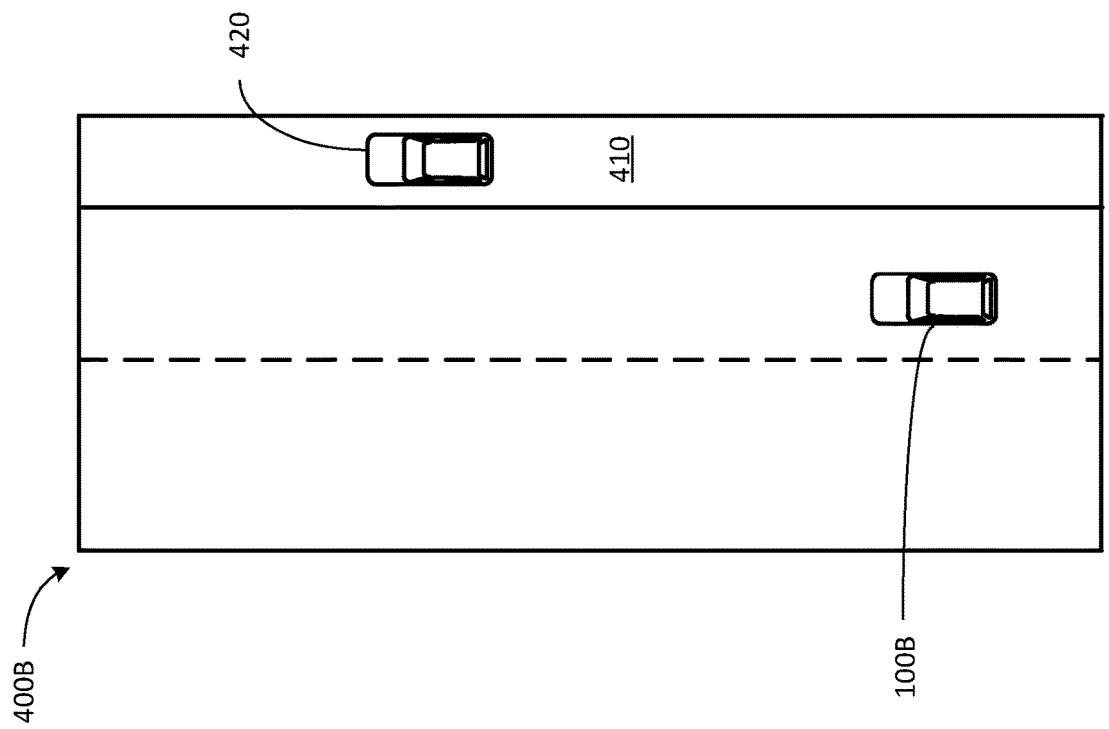
FIGS. 4A-4B are diagrams illustrating an example driving environment event scenario for implementing real-time multi-vehicle sensing and perception, in accordance with some implementations of the present disclosure.
Figure 4B:
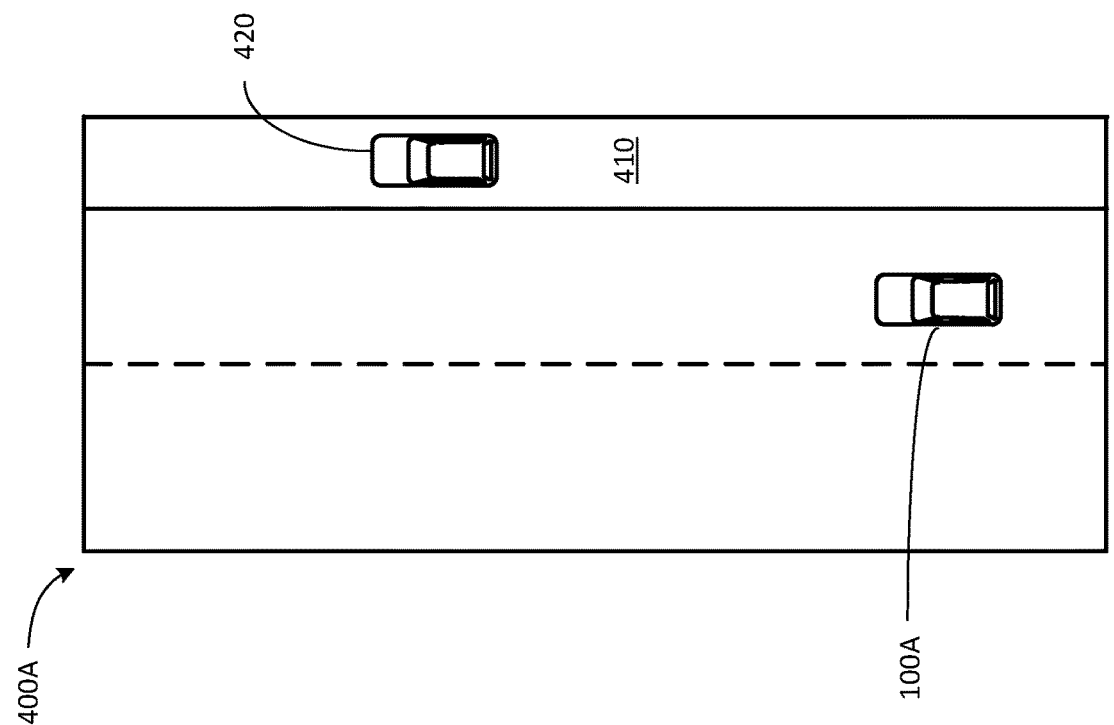

FIGS. 4A-4B are diagrams 400A-400B illustrating an example driving environment event scenario ("scenario") for implementing real-time multi-vehicle sensing and perception, in accordance with some implementations of the present disclosure. More specifically, the scenario is an example of a road object event scenario in which an object is observed on a road.

The diagram 400A shows a portion of a road (e.g., highway) including the AV 100A, a shoulder 410 and an object 420 located in the shoulder. In this illustrative example, the object 420 is a vehicle stopped on the shoulder 420. However, the object 420 can be any type of object and can be located in any region of the road in accordance with implementations described herein. For example, the object 420 can correspond to a traffic accident, a pedestrian on the highway, a construction zone, etc.

The diagram 400B shows the portion of the road including the AV 100B approaching the object 420 on the shoulder 410. As described above, the AV 100A and the AV 100B can be included within a fleet of AVs. It is assumed that the AV 100A had observed the object 420 at some time before the scenario shown in diagram 400B (e.g., the AV 100A is the first AV of the fleet to observe the object 420).

The AV 100B may want to change lanes to provide some space away from the stopped vehicle (which may be required by law). In scenarios in which the object 420 is located in the same lane as the AV 100B, the AV 100B may want to change lanes to avoid a collision with the object 420. In scenarios in which the object 420 is located in the adjacent lane to the AV 100B, the AV 100B may want to change lanes to provide some space away from the object 420. Such a lane change can be difficult or impossible depending on the surrounding traffic conditions, so receiving an early warning of a stopped vehicle can enable the AV 100B to change lanes ahead of the object 420, even before it is visible.

To obtain an early warning of the object 420 in making autonomous driving decisions, the AV 100B can receive a set of event observation data related to the observation of the object 420 made by the AV 100A. For example, the set of event observation data can include the coordinate location of the object 420 as determined by the AV 100A.

In some implementations, the set of event observation data can be provided to the AV 100B via a server-orchestrated communication system (e.g., the system 200 of FIGS. 2A-2B). For example, at least one server of the server-orchestrated communication system (e.g., server 210A of FIGS. 2A-2B) can receive a first set of event observation data related to the observation of the object 420 (e.g., a set of raw event observation data) from the AV 100A and store the first set of event observation data in a data store (e.g., the database 220 of FIGS. 2A-2B). In response to determining that the AV 100B is in the vicinity of the object 420, the at least one server (e.g., server 210B of FIGS. 2A-2B) can provide a second set of event observation data related to the observation of the object 420 to the AV 100B (e.g., a set of relevant observation event data related to the observation of the object 420 obtained by processing the set of raw event observation data). In addition, each passing AV of the fleet can update the current state, including providing observation event data to the at least one server indicating that the object 420 is no longer present.

In some implementations, the AV 100A can share the set of event observation data directly with the AV 100B. For example, the AV 100A can broadcast a message to the AV 100B using direct wireless communication. Examples of direct wireless communication include short range wireless communication protocols (e.g., Bluetooth, Wi-Fi) and long-range wireless communication protocols (e.g., LoRA). Further details regarding FIGS. 4A-4B are described above with reference to FIGS. 1-2.

Figure 5B:
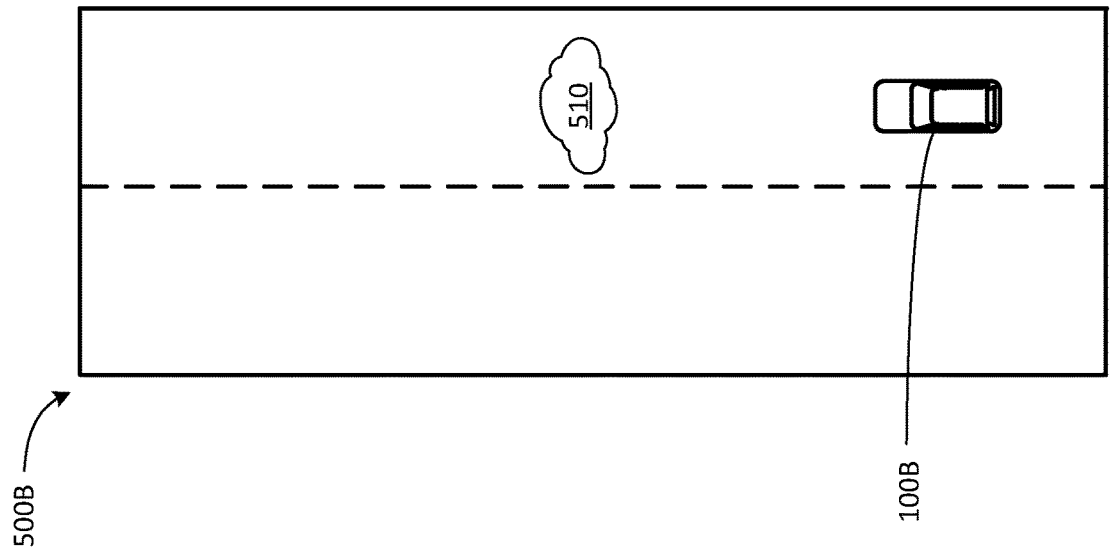
FIGS. 5A-5B are diagrams illustrating an example driving environment event scenario for implementing real-time multi-vehicle sensing and perception, in accordance with some implementations of the present disclosure.
Figure 5A:
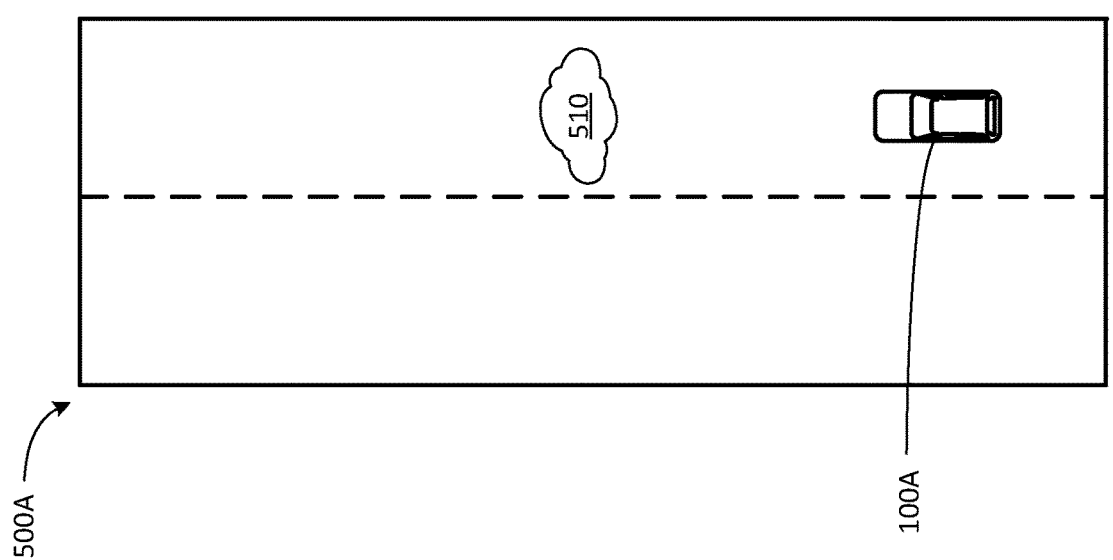

FIGS. 5A-5B are diagrams 500A-500B illustrating an example driving environment event scenario ("scenario") for implementing real-time multi-vehicle sensing and perception, in accordance with some implementations of the present disclosure. More specifically, the scenario is an example of a weather event scenario in which a weather hazard is observed on a road.

The diagram 500A shows a portion of a road including the AV 100A and a weather hazard 510. The weather hazard 510 can correspond to a hazardous road patch. For example, the weather hazard 510 can correspond to an icy road patch, a snowy road patch, a puddle, etc. As another example, the weather hazard 510 can be an atmospheric condition (e.g., fog, rain, snow, hail).

The diagram 500B shows the portion of the road including the AV 100B approaching the weather hazard 510. As described above, the AV 100A and the AV 100B can be included within a fleet of AVs. It is assumed that the AV 100A had observed the weather hazard 510 at some time before the scenario shown in diagram 500B (e.g., the AV 100A is the first AV of the fleet to observe the weather hazard 510).

The AV 100B may want to make autonomous driving decisions to mitigate potential hazards cause by the weather hazard 510. For example, if the weather hazard 510 is a hazardous road patch, then the AV 100B may want to change lanes to avoid the hazardous road patch. Such a lane change can be difficult or impossible depending on the surrounding traffic conditions, so receiving an early warning of the hazardous road patch can enable the AV 100B to change lanes ahead of the hazardous road patch, even before it is visible. As another example, if the weather hazard 510 is an atmospheric condition, then the AV 100B may want to navigate around the atmospheric condition or drive with additional caution upon entering the atmospheric condition. It may be difficult for the AV 100B to recognize the atmospheric condition until the AV 100B has driven within the area of the atmospheric condition. For example, it may be difficult for the AV 100B to recognize reduced visibility due to fog until the AV 100B has driven into the fog. Moreover, while external meteorological data may be available to the AV 100B, the external meteorological data can be too coarse in time (e.g., meteorological data may be reported by weather stations in 15 minute windows) and/or space (e.g., there may be a low geospatial density of weather stations reporting meteorological data within a region). For example, fog can be highly localized and fog conditions in an area can change rapidly.

To obtain an early warning of the weather hazard 510 and address the coarseness of external meteorological data in making autonomous driving decisions, the AV 100B can receive a set of event observation data related to the observation of the weather hazard 510 made by the AV 100A. For example, if the weather hazard 510 is a hazardous road patch, then the set of event observation data can include the coordinate location of the weather hazard 510 (e.g., hazardous road patch or atmospheric condition).

In some implementations, the set of event observation data can be provided to the AV 100B via a server-orchestrated communication system (e.g., the system 200 of FIGS. 2A-2B). For example, at least one server of the server-orchestrated communication system (e.g., server 210A of FIGS. 2A-2B) can receive a first set of event observation data related to the observation of the weather hazard 510 (e.g., a set of raw event observation data) from the AV 100A and store the first set of event observation data in a data store (e.g., the database 220 of FIGS. 2A-2B). In response to determining that the AV 100B is in the vicinity of the weather hazard 510, the at least one server (e.g., server 210B of FIGS. 2A-2B) can provide a second set of event observation data related to the observation of the weather hazard 510 to the AV 100B (e.g., a set of relevant observation event data related to the observation of the weather hazard 510 obtained by processing the set of raw event observation data). In addition, each passing AV of the fleet can update the current state, including providing observation event data to the at least one server indicating that the weather hazard 510 is no longer present.

In some implementations, the AV 100A can share the set of event observation data directly with the AV 100B. For example, the AV 100A can broadcast a message to the AV 100B using direct wireless communication. Examples of direct wireless communication include short range wireless communication protocols (e.g., Bluetooth, Wi-Fi) and long-range wireless communication protocols (e.g., LoRA). Further details regarding FIGS. 5A-5B are described above with reference to FIGS. 1-2.

Figure 6B:
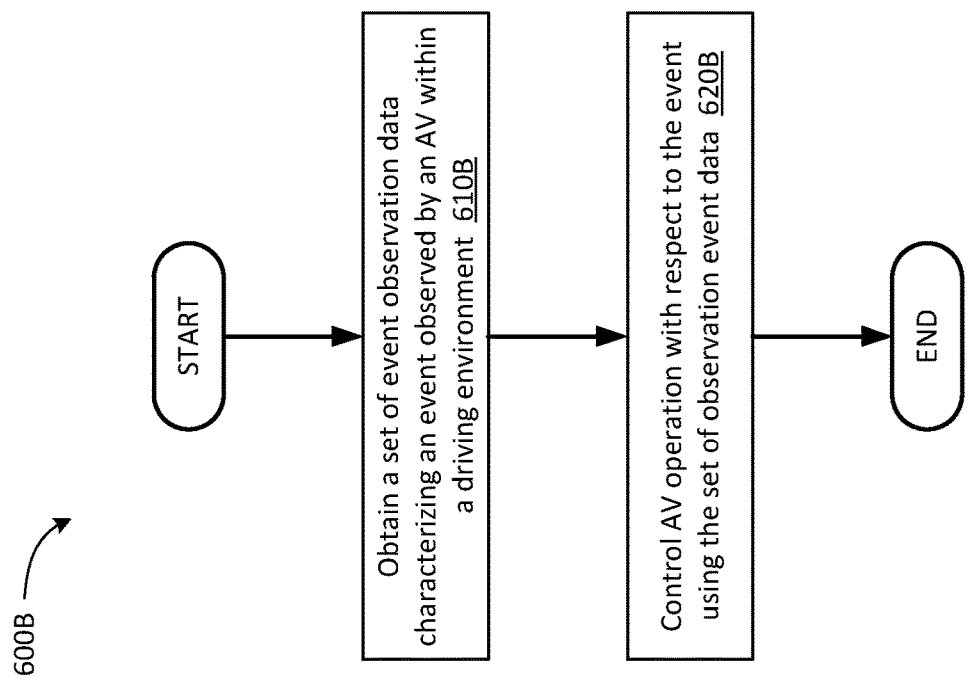
FIGS. 6A-6D illustrates example methods of implementing real-time multi-vehicle sensing and perception, in accordance with some implementations of the present disclosure.
Figure 6A:
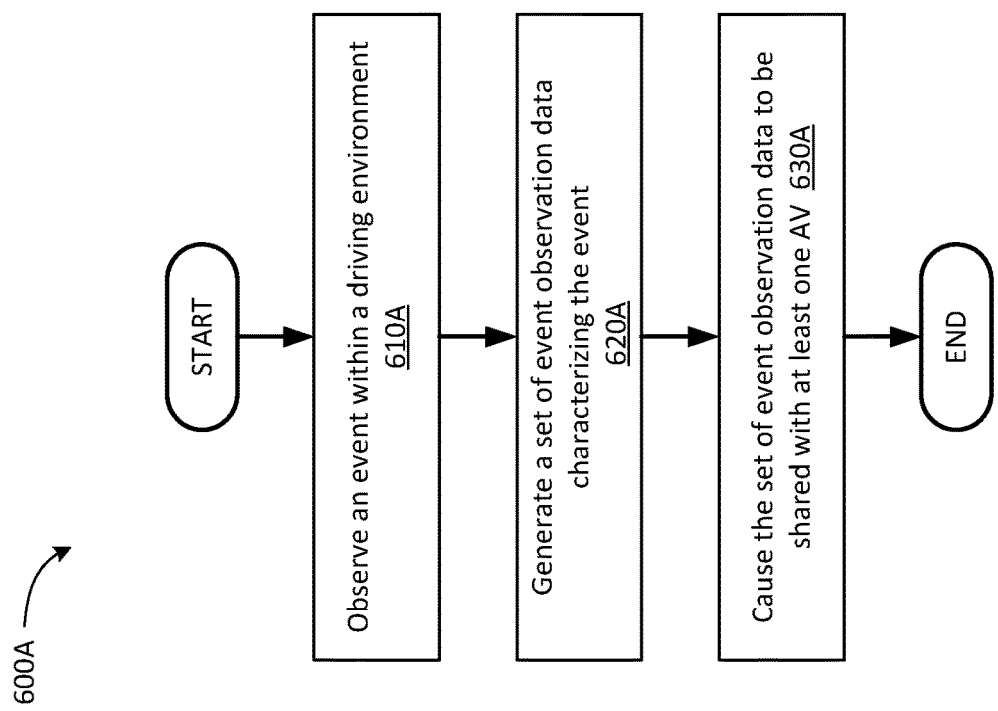

FIG. 6A illustrates an example method 600A of real-time multi-vehicle sensing and perception, in accordance with some implementations of the present disclosure. A processing device, having one or more processing units (CPUs), and or graphics processing units (GPU) and memory devices communicatively coupled to the CPU(s) and/or GPUs, can perform method 600A and/or each of its individual functions, routines, subroutines, or operations. The processing device executing method 600A can perform instructions issued by various components of the system 200 of FIG. 2, e.g., AV 100A. In certain implementations, a single processing thread can perform method 600A. Alternatively, two or more processing threads can perform method 600A, each thread executing one or more individual functions, routines, subroutines, or operations of the methods. In an illustrative example, the processing threads implementing method 600A can be synchronized (e.g., using semaphores, critical sections, and/or other thread synchronization mechanisms). Alternatively, the processing threads implementing method 600A can be executed asynchronously with respect to each other. Various operations of method 600A can be performed in a different order compared with the order shown in FIG. 6A. Some operations of method 600A can be performed concurrently with other operations. Some operations can be optional.

At operation 610A, processing logic observes an event within a driving environment. For example, the event can be observed using data from a set of sensors of a sensing system (e.g., the sensing system 110 of FIG. 1). For example, the set of sensors can include at least one of: radar, lidar, sonar or camera. The event can reflect a hazardous scenario within the driving environment in which early notification of the event can improve autonomous driving decision making. For example, as described in further detail above with reference to FIGS. 1-3, the event can correspond to an emergency vehicle observed within the driving environment (e.g., attempting to drive through an intersection with its siren on). As another example, as described in further detail above with reference to FIGS. 1-2B and 4A-4B, the even can correspond to a hazard observed on a road (e.g., highway) within the driving environment (e.g., a stopped vehicle, a traffic accident, a pedestrian or a construction zone). As yet another example, as described in further detail above with reference to FIGS. 1-2B and 5A-5B, the event can correspond to a weather hazard observed within the driving environment. Examples of weather hazards include hazardous road conditions (e.g., wet road patches, icy road patches, snowy road patches) and hazardous atmospheric conditions (e.g., fog, rain, snow, hail).

At operation 620A, processing logic generates a set of event observation data characterizing the event. In some implementations, the set of event observation data is a set of raw event observation data. In some implementations, generating the set of event observation data includes preprocessing a set of raw event observation data.

At operation 630A, processing logic causes the set of event observation data to be shared with at least one AV. The at least one AV can include at least one AV that is determined to be in the vicinity of the event after the event is observed at operation 610A. For example, the at least one AV can be included within a fleet of AVs.

In some implementations, causing the set of event observation data to be shared with the at least one AV includes sending the set of event observation data to at least one server of a server-orchestrated communication system. The server-orchestrated communication system can be used to communicate observation event data between AVs of the fleet. As described in further detail above with reference to FIGS. 1-5B and as will be described in further detail below with reference to FIGS. 6C-6D, the at least one server can store the set of event observation data within a data store (e.g., database) and, upon identifying at least one AV within the vicinity of the event, can send (e.g., broadcast) a second set of event observation data to the at least one AV (e.g., either the set of event observation data or a processed version of the set of event observation data). The second set of event observation data can include relevant data characterizing the event that can be used by the at least one AV to supplement its own onboard generated sensing and perception data (e.g., data obtained from the sensing system 110 and the perception system 130 of FIG. 1) within the driving environment. For example, the second set of event observation data can include at least one of: heading, speed, or coordinate location. Accordingly, the at least one AV can use the second set of event observation data, in conjunction with its own onboard generated sensing and perception data, to control AV operation via an AV control system (e.g., AVCS 140 of FIG. 1).

In some implementations, causing the set of event observation data to be shared with the at least one AV can include determining that the at least one AV is in the vicinity of the event and, in response to the determination, sharing the set of event observation data directly with the at least one AV. For example, sharing the set of event observation data directly with the at least one AV can include broadcasting a message to the at least one AV using direct wireless communication. Examples of direct wireless communication include short range wireless communication protocols (e.g., Bluetooth, Wi-Fi) and long-range wireless communication protocols (e.g., LoRA). Further details regarding operations 610A-620A are described above with reference to FIGS. 1-5B and will be described in further detail below with reference to FIGS. 6C-6D.

FIG. 6B illustrates an example method 600B of real-time multi-vehicle sensing and perception, in accordance with some implementations of the present disclosure. A processing device, having one or more processing units (CPUs), and or graphics processing units (GPU) and memory devices communicatively coupled to the CPU(s) and/or GPUs, can perform method 600B and/or each of its individual functions, routines, subroutines, or operations. The processing device executing method 600B can perform instructions issued by various components of the system 200 of FIG. 2, e.g., AV 100B. In certain implementations, a single processing thread can perform method 600B. Alternatively, two or more processing threads can perform method 600B, each thread executing one or more individual functions, routines, subroutines, or operations of the methods. In an illustrative example, the processing threads implementing method 600B can be synchronized (e.g., using semaphores, critical sections, and/or other thread synchronization mechanisms). Alternatively, the processing threads implementing method 600B can be executed asynchronously with respect to each other. Various operations of method 600B can be performed in a different order compared with the order shown in FIG. 6B. Some operations of method 600B can be performed concurrently with other operations. Some operations can be optional.

At operation 610B, processing logic can obtain a set of event observation data characterizing an event observed by an AV within a driving environment. The AV can be included within a fleet of AVs.

The set of event observation data can characterize an event reflecting a hazardous scenario within the driving environment in which early notification of the event can improve autonomous driving decision making. For example, as described in further detail above with reference to FIGS. 2A-3, the set of event observation data can characterize an emergency vehicle observed within the driving environment (e.g., attempting to drive through an intersection with its siren on). As another example, as described in further detail above with reference to FIGS. 1-2B and 4A-4B, the set of event observation data can characterize a hazard observed on a road (e.g., highway) within the driving environment (e.g., a stopped vehicle, a traffic accident, a pedestrian or a construction zone). As yet another example, as described in further detail above with reference to FIGS. 1-2B and 5A-5B, the set of event observation data can characterize a weather hazard observed within the driving environment. Examples of weather hazards include hazardous road conditions (e.g., wet road patches, icy road patches, snowy road patches) and hazardous atmospheric conditions (e.g., fog, rain, snow, hail).

In some implementations, obtaining the set of event observation data can include receiving the set of event observation data from at least one server of a server-orchestrated communication system. The server-orchestrated communication system can be used to communicate observation event data between AVs of the fleet. As described in further detail above with reference to FIGS. 1-6A and as will be described in further detail below with reference to FIGS. 6C-6D, the at least one server can, upon identifying at least one AV within the vicinity of the event, send (e.g., broadcast) the observation event data to the at least one AV. For example, the at least one server can, prior to sending the set of event observation data, process a set of raw event observation data to generate the set of event observation data. The set of event observation data can include relevant data characterizing the event that can be used by the at least one AV to supplement its own onboard generated sensing and perception data (e.g., data obtained from the sensing system 110 and the perception system 130 of FIG. 1) within the driving environment. For example, the set of event observation data can include at least one of: heading, speed, or coordinate location.

In some implementations, obtaining the set of event observation data can include receiving the set of event observation data directly from the AV. For example, receiving the set of event observation data directly from the AV can include receiving a message broadcast by the AV using direct wireless communication. Examples of direct wireless communication include short range wireless communication protocols (e.g., Bluetooth, Wi-Fi) and long-range wireless communication protocols (e.g., LoRA). Further details regarding sharing the set of event observation data with the at least one AV using direct vehicle communication are described above with reference to FIGS. 1-6A.

At operation 620B, processing logic can control AV operation with respect to the event using the set of event observation data. The set of event observation data, in conjunction with onboard generated sensing and perception data, can be used to control AV operation. For example, the set of event observation data can be used by an AV control system (e.g., AVCS 140 of FIG. 1) to make autonomous driving decisions that can improve the reaction to the event and thus improve autonomous driving safety. Further details regarding operations 610B-620B are described above with reference to FIGS. 1-5B and will now be described in further detail below with reference to FIGS. 6C-6D.

Figure 6D:
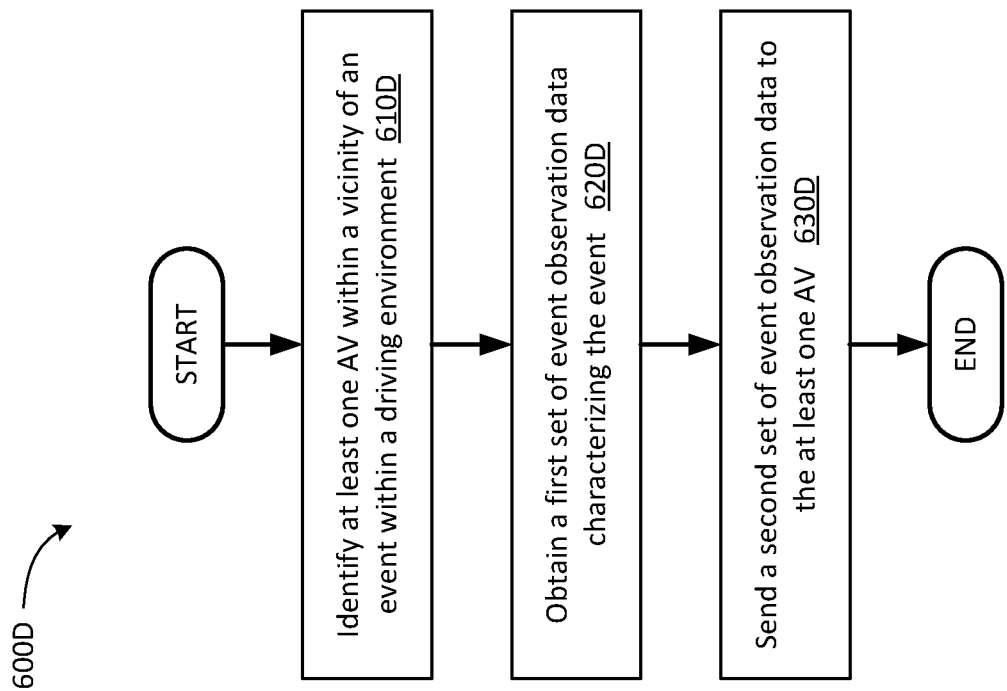
Figure 6C:
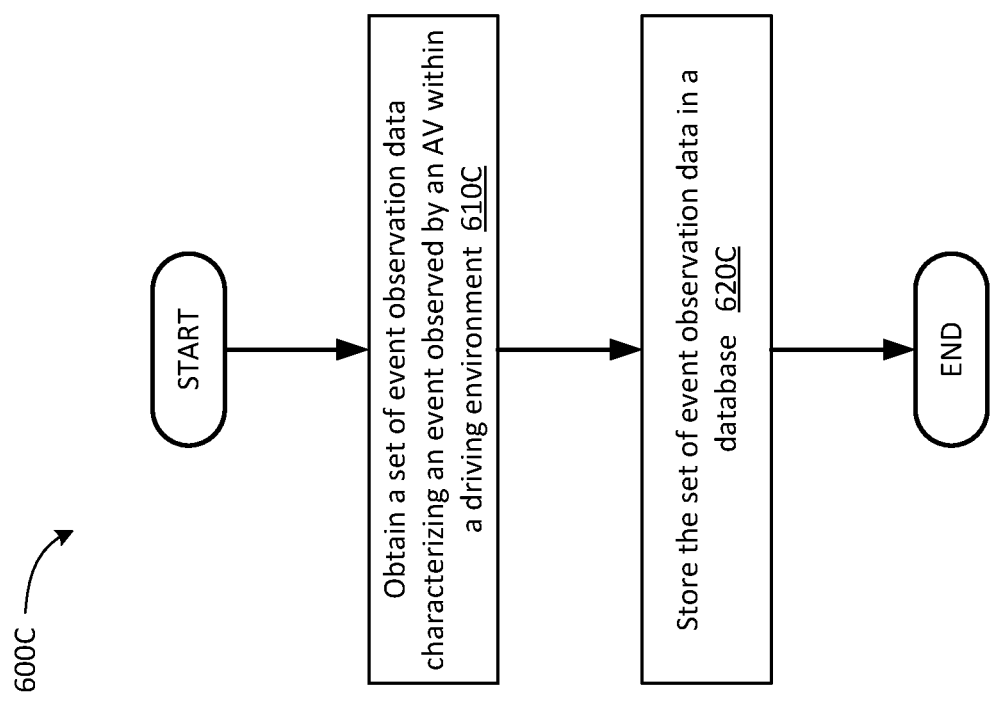

FIG. 6C illustrates an example method 600C of real-time multi-vehicle sensing and perception, in accordance with some implementations of the present disclosure. A processing device, having one or more processing units (CPUs), and or graphics processing units (GPU) and memory devices communicatively coupled to the CPU(s) and/or GPUs, can perform method 600C and/or each of its individual functions, routines, subroutines, or operations. The processing device executing method 600C can perform instructions issued by various components of the system 200 of FIG. 2, e.g., server 210A. In certain implementations, a single processing thread can perform method 600C. Alternatively, two or more processing threads can perform method 600C, each thread executing one or more individual functions, routines, subroutines, or operations of the methods. In an illustrative example, the processing threads implementing method 600C can be synchronized (e.g., using semaphores, critical sections, and/or other thread synchronization mechanisms). Alternatively, the processing threads implementing method 600C can be executed asynchronously with respect to each other. Various operations of method 600C can be performed in a different order compared with the order shown in FIG. 6C. Some operations of method 600C can be performed concurrently with other operations. Some operations can be optional.

At operation 610C, processing logic can obtain a set of event observation data characterizing an event observed by an AV within a driving environment. For example, obtaining the set of event observation data can include receiving the set of event observation data from the AV. The AV can be included within a fleet of AVs.

The set of event observation data can characterize an event reflecting a hazardous scenario within the driving environment in which early notification of the event can improve autonomous driving decision making. For example, as described in further detail above with reference to FIGS. 1-3, the set of event observation data can characterize an emergency vehicle observed within the driving environment (e.g., attempting to drive through an intersection with its siren on). As another example, as described in further detail above with reference to FIGS. 1-2B and 4A-4B, the set of event observation data can characterize a hazard observed on a road (e.g., highway) within the driving environment (e.g., a stopped vehicle, a traffic accident, a pedestrian or a construction zone). As yet another example, as described in further detail above with reference to FIGS. 1-2B and 5A-5B, the set of event observation data can characterize a weather hazard observed within the driving environment. Examples of weather hazards include hazardous road conditions (e.g., wet road patches, icy road patches, snowy road patches) and hazardous atmospheric conditions (e.g., fog, rain, snow, hail).

At operation 620C, processing logic can store the set of event observation data in a database (or other suitable data store). In some implementations, the database is an in-memory database. In some implementations, the set of event observation data is a set of raw event observation data stored in the database. In some implementations, the set of event observation data received from the AV is a set of raw event observation data, and processing logic can process the set of raw event observation data to generate a set of processed event observation data that is stored in the database. For example, the set of processed event observation data can include at least one of: heading, speed, or coordinate location.

As described in further detail above with reference to FIGS. 1-6B and as will be described in further detail below with reference to FIG. 6D, the set of event observation data can be sent (e.g., broadcast) to at least one AV determined to be in the vicinity of the event. The set of event observation data, in conjunction with onboard generated sensing and perception data, can be used to control AV operation of the at least one AV. Further details regarding operations 610C-620C are described above with reference to FIGS. 1-6B.

FIG. 6D illustrates an example method 600D of real-time multi-vehicle sensing and perception, in accordance with some implementations of the present disclosure. A processing device, having one or more processing units (CPUs), and or graphics processing units (GPU) and memory devices communicatively coupled to the CPU(s) and/or GPUs, can perform method 600D and/or each of its individual functions, routines, subroutines, or operations. The processing device executing method 600D can perform instructions issued by various components of the system 200 of FIG. 2, e.g., server 210B. In certain implementations, a single processing thread can perform method 600D. Alternatively, two or more processing threads can perform method 600D, each thread executing one or more individual functions, routines, subroutines, or operations of the methods. In an illustrative example, the processing threads implementing method 600C can be synchronized (e.g., using semaphores, critical sections, and/or other thread synchronization mechanisms). Alternatively, the processing threads implementing method 600D can be executed asynchronously with respect to each other. Various operations of method 600D can be performed in a different order compared with the order shown in FIG. 6D. Some operations of method 600D can be performed concurrently with other operations. Some operations can be optional.

At operation 610D, processing logic can identify at least one AV within the vicinity of an event within a driving environment. Each AV can be included within a fleet of AVs. Identifying an AV within the vicinity of the event can include determining that a distance between the AV and the event satisfies a threshold condition. For example, identifying an AV within the vicinity of the event can include determining that the distance is less than or equal to a threshold distance.

The event can reflect a hazardous scenario within the driving environment in which early notification of the event can improve autonomous driving decision making. For example, as described in further detail above with reference to FIGS. 1-3, the event can correspond to an emergency vehicle observed within the driving environment (e.g., attempting to drive through an intersection with its siren on). As another example, as described in further detail above with reference to FIGS. 1-2B and 4A-4B, the event can correspond to a hazard observed on a road (e.g., highway) within the driving environment (e.g., a stopped vehicle, a traffic accident, a pedestrian or a construction zone). As yet another example, as described in further detail above with reference to FIGS. 1-2B and 5A-5B, the event can correspond to a weather hazard observed within the driving environment. Examples of weather hazards include hazardous road conditions (e.g., wet road patches, icy road patches, snowy road patches) and hazardous atmospheric conditions (e.g., fog, rain, snow, hail).

At operation 620D, processing logic can obtain a first set of event observation data characterizing the event. For example, in response to identifying at least one AV within the vicinity of the event, the processing logic can query a data store (e.g., database) maintaining the first set of event observation data, and receive the first set of event observation data from the data store in response to the query. The first set of event observation data may have been generated by another AV (e.g., of the fleet of AVs) that had observed the event prior to identifying the at least one AV within the vicinity of the event.

At operation 630D, processing logic can send a second set of event observation data to the at least one AV. The set of event observation data is sent to notify the at least one AV that it is in the vicinity of the event. For example, sending the second set of event observation data to the at least one AV can include broadcasting a message including the second set of event observation data to the at least one AV. The second set of event observation data can include relevant data characterizing the event that can be used by the at least one AV to supplement its own onboard generated sensing and perception data (e.g., data obtained from the sensing system 110 and the perception system 130 of FIG. 1) within the driving environment. For example, the second set of event observation data can include at least one of: heading, speed, or coordinate location.

In some implementations, the first set of event observation data is a set of raw event observation data and the second set of event observation data is a set of processed event observation data. For example, the second set of event observation data, prior to being sent to the at least one AV at operation 630D, can be generated by processing the set of raw event observation data. In some implementations, the first set of event observation data is the same as the second set of event observation data. For example, the first set of event observation data can be stored in the data store as the set of processed event observation data prior to being received from the data store at operation 620D (e.g., the AV that had previously observed the event may have preprocessed the first set of event observation data). Further details regarding operations 610D-630D are described above with reference to FIGS. 1-6C.

Figure 7:
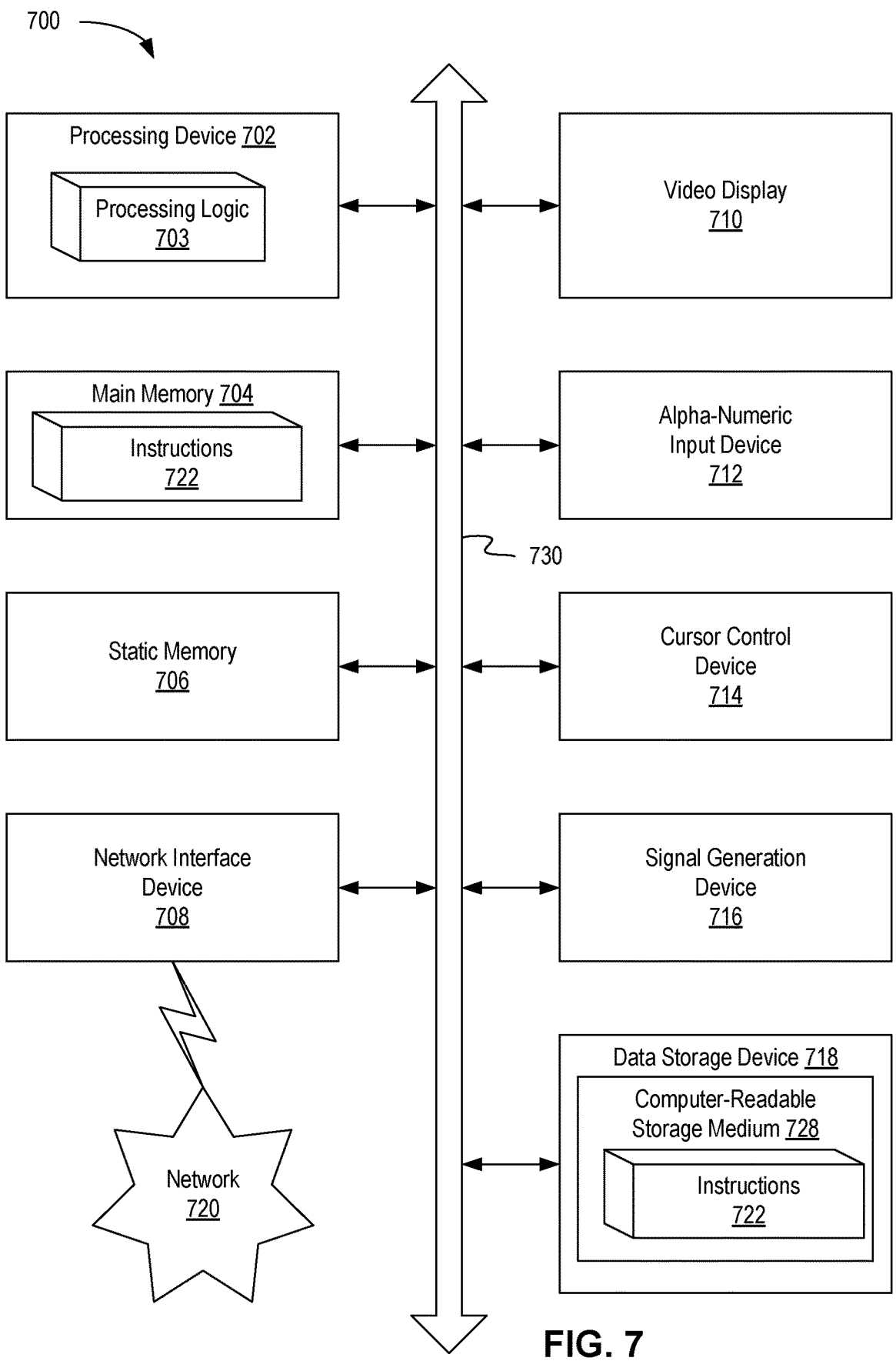
FIG. 7 depicts a block diagram of an example computer device, in accordance with some implementations of the present disclosure.

FIG. 7 depicts a block diagram of an example computer device 700 capable of enabling fast and reliable object identification and tracking in autonomous driving environments, in accordance with some implementations of the present disclosure, in accordance with some implementations of the present disclosure. Example computer device 700 can be connected to other computer devices in a LAN, an intranet, an extranet, and/or the Internet. Computer device 700 can operate in the capacity of a server in a client-server network environment. Computer device 700 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 700 can include a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which can communicate with each other via a bus 730.

Processing device 702 (which can include processing logic 703) represents one or more general-purpose processing devices such as a microprocessor, central processing unit, or the like. More particularly, processing device 702 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 702 can be configured to execute instructions performing method 600 of verification of radar detections using machine-learning models in autonomous vehicle applications.

Example computer device 700 can further comprise a network interface device 708, which can be communicatively coupled to a network 720. Example computer device 700 can further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 can include a computer-readable storage medium (or, more specifically, a non-transitory computer-readable storage medium) 728 on which is stored one or more sets of executable instructions 722. In accordance with one or more aspects of the present disclosure, executable instructions 722 can comprise executable instructions performing method 600 of verification of radar detections using machine-learning models in autonomous vehicle applications.

Executable instructions 722 can also reside, completely or at least partially, within main memory 704 and/or within processing device 702 during execution thereof by example computer device 700, main memory 704 and processing device 702 also constituting computer-readable storage media. Executable instructions 722 can further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "observing," "generating," "causing," "determining," "sharing," "broadcasting," "controlling," "receiving," "identifying," "sending," "processing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:
   at least one server comprising:
      a memory storing instructions; and
      a processing device operatively coupled to the memory, wherein the instructions, when executed by the processing device, cause the processing device to perform operations comprising:
         receiving, from a first autonomous vehicle (AV), a first set of raw event observation data characterizing an event observed by the first AV at a first point in time, the event reflecting a scenario within a driving environment;
         upon identifying a second AV within a vicinity of the event observed by the first AV, generating, based on the first set of event observation data, a second set of processed event observation data characterizing the event observed by the first AV; and
         sending, to the second AV, the second set of processed event observation data, characterizing the event observed by the first AV, to cause an AV control system of the second AV to generate, using the second set of processed event observation data, an optimal route for the second AV with respect to the event observed by the first AV.

2. The system of claim 1, wherein the first AV and the second AV are comprised within a fleet of AVs.

3. The system of claim 1, wherein the event corresponds to an emergency vehicle, a hazard observed on a road, or a weather hazard observed within the driving environment.

4. The system of claim 1, wherein the second set of processed event observation data comprises at least one of: heading, speed or coordinate location.

5. The system of claim 1, wherein the at least one server is operatively coupled to a data store, wherein the first set of raw event observation data is stored in the data store, and wherein the second set of processed event observation data is generated based on data stored within the data store.

6. The system of claim 5, wherein generating the second set of processed event observation data comprises:
   receiving, from the data store, the first set of raw event observation data; and
   processing the first set of raw event observation data to generate the second set of processed event observation data.

7. The system of claim 1, wherein:
   the operations further comprise receiving a third set of event observation data characterizing the event observed by a third AV at a second point in time; and
   the second set of processed event observation data reflects the third set of event observation data characterizing the event observed by the third AV.

8. A method for at least one server comprising:
   receiving, from a first autonomous vehicle (AV), a first set of raw event observation data characterizing an event observed by the first AV at a first point in time, the event reflecting a scenario within a driving environment;
   upon identifying a second AV within a vicinity of the event observed by the first AV, generating, based on the first set of event observation data, a second set of processed event observation data characterizing the event observed by the first AV; and
   sending, to the second AV, the second set of processed event observation data, characterizing the event observed by the first AV, to cause an AV control system of the second AV to generate, using the second set of processed event observation data, an optimal route for the second AV with respect to the event observed by the first AV.

9. The method of claim 8, wherein the first AV and the second AV are comprised within a fleet of AVs.

10. The method of claim 8, wherein the event corresponds to an emergency vehicle, a hazard observed on a road, or a weather hazard observed within the driving environment.

11. The method of claim 8, wherein the second set of processed event observation data comprises at least one of: heading, speed or coordinate location.

12. The method of claim 8, wherein the at least one server is operatively coupled to a data store, wherein the first set of raw event observation data is stored in the data store, and wherein the second set of processed event observation data is generated based on data stored within the data store.

13. The method of claim 12, wherein generating the second set of processed event observation data comprises:
   receiving, from the data store, the first set of raw event observation data; and
   processing the first set of raw event observation data to generate the second set of processed event observation data.

14. The method of claim 8, further comprising:
   receiving a third set of event observation data characterizing the event observed by a third AV at a second point in time, wherein the second set of processed event observation data reflects the third set of event observation data characterizing the event observed by the third AV.

15. A non-transitory computer-readable medium comprising instructions, which when executed by a processing device of at least one server cause the processing device to perform operations comprising:
   receiving, from a first autonomous vehicle (AV), a first set of raw event observation data characterizing an event observed by the first AV at a first point in time, the event reflecting a scenario within a driving environment;
   upon identifying a second AV within a vicinity of the event observed by the first AV, generating, based on the first set of event observation data, a second set of processed event observation data characterizing the event observed by the first AV; and
   sending, to the second AV, the second set of processed event observation data, characterizing the event observed by the first AV, to cause an AV control system of the second AV to generate, using the second set of processed event observation data, an optimal route for the second AV with respect to the event observed by the first AV.

16. The non-transitory computer-readable medium of claim 15, wherein the first AV and the second AV are comprised within a fleet of AVs.

17. The non-transitory computer-readable medium of claim 15, wherein the event corresponds to an emergency vehicle, a hazard observed on a road, or a weather hazard observed within the driving environment.

18. The non-transitory computer-readable medium of claim 15, wherein the second set of processed event observation data comprises at least one of: heading, speed or coordinate location.

19. The non-transitory computer-readable medium of claim 15, wherein the at least one server is operatively coupled to a data store, wherein the first set of raw event observation data is stored in the data store, and wherein the second set of processed event observation data is generated based on data stored within the data store.

20. The non-transitory computer-readable medium of claim 15, wherein:
   the operations further comprise receiving a third set of event observation data characterizing the event observed by a third AV at a second point in time; and
   the second set of processed event observation data reflects the third set of event observation data characterizing the event observed by the third AV.

\* \* \* \* \*